Oct. 31, 1933.  G. B. SHANKLIN  1,933,347
UNDERGROUND OIL FILLED CABLE
Filed Oct. 4, 1928
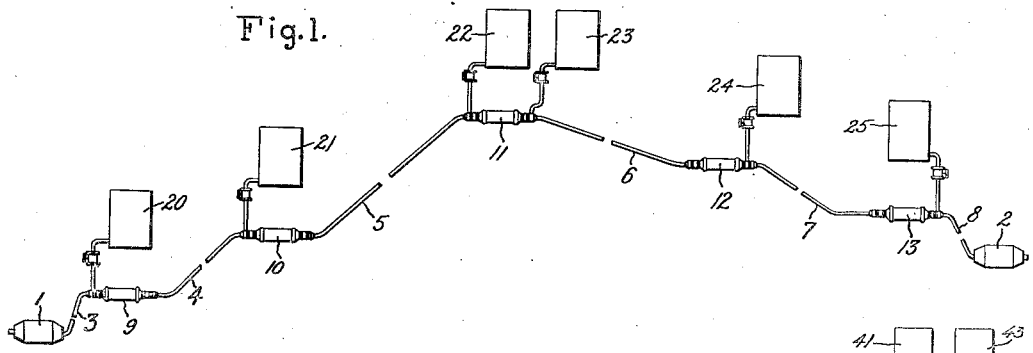
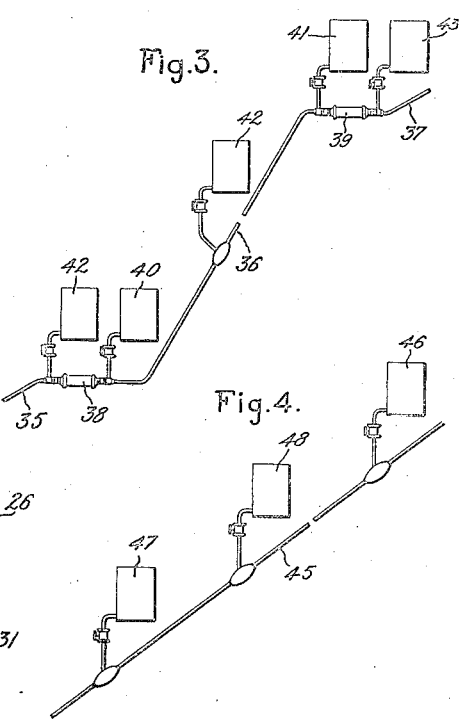
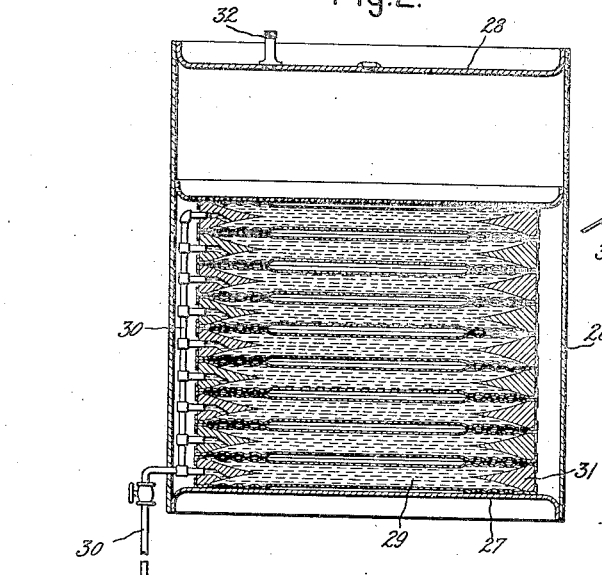
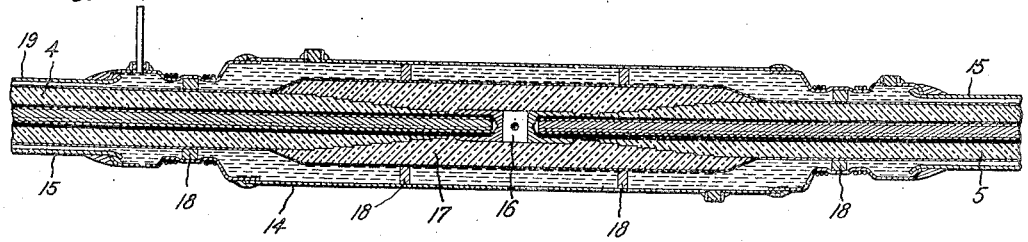
Inventor:
George B. Shanklin,
by Charles E. Tullar
His Attorney.

Patented Oct. 31, 1933

1,933,347

UNITED STATES PATENT OFFICE 1,933,347

UNDERGROUND OIL-FILLED CABLE

George B. Shanklin, Schenectady, N. Y., assignor to General Electric Company, a corporation of New York Application October 4, 1928. Serial No. 310,398

18 Claims. (Cl. 173—264)

The present invention relates to underground oil-filled cable, such as is utilized for comparatively high voltage transmission.

In connection with oil-filled cable, it is required that the cable be maintained always full of oil and that the pressure in the cable be maintained always at a value high enough so that air and moisture will not leak into it, but that on the other hand, the pressure due to static head and to expansion of the oil caused by the temperature changes should not become high enough to burst the cable. To take care of these conditions it is known to provide oil expansion reservoirs connected to the cable at suitable points and arranged to receive oil from the cable when the oil expands and to feed oil to the cable when the oil contracts. It will be understood that the oil expands and contracts due to temperature changes which may be caused by loading the cable or by atmospheric conditions. The principal changes are those due to load.

The reservoirs take oil from or give oil to the cable by connection directly to longitudinal channels built into the cable cross section. These channels may be inside the copper conductors in the form of a hollow core, or they may be directly under the lead sheath in any one of several available forms. In the case of multi-conductor cable the channels may be in the curved, wedge-shaped filler spaces, which are not otherwise useful. The present invention lends itself particularly well to those designs of cable in which the channels are either directly under the lead sheath or, in the case of multi-conductor cable, in the filler spaces, although the invention is applicable to other designs of cable, as will be shown later.

As long as the oil is not otherwise restricted it will flow more or less freely along these continuous channels, depending upon the cross sectional dimensions of the channels, the viscosity of the oil, and the quantity of oil required.

For various reasons, (governed largely by the maximum allowable oil pressure inside the cable), it is necessary to sectionalize the cable lines, that is, divide it up into sections in such a way that oil can neither flow nor leak from one section to another, but at the same time allowing the electrical current to flow. This sectionalizing is accomplished by the insertion of a special design of oil tight joint at the points desired called an oil "stop joint". The requirements, of necessity, make the stop joint a large, expensive affair, costing several times as much as an ordinary cable joint and requiring more space. Due to these reasons the stop joint is used only where absolutely necessary, for instance, at points where the irregular, sloping nature of the earth's surface causes the oil head pressure in the cable to build up to a predetermined maximum safe value.

In consequence, the sections in cable lines of this type are quite long, being in some cases from one to one and one-fourth miles in length. There are several objections to such long sections. First, the principle of segregation is not realized. If, from any cause, the cable bursts there is danger of draining oil from a part or even the entire section and allowing moisture and air to enter, requiring replacement of a large amount of cable. Second, it is necessary to make the oil channels inside the cable quite large, increasing the size and cost of cable, to avoid excessive pressure drop during periods of oil flow. Third, long sections cause complications in methods of installation, operation and repair, requiring highly skilled engineering service.

The simplest and most ideal form of cable line of this type would be one in which every ordinary splice, joining the reel lengths (300 to 700 ft.) of cable was replaced by a stop joint, thus making every reel length a true section and giving the maximum amount of segregation. But the use of so many stop joints is far too costly, as has already been pointed out. Another factor of great importance in a cable installation is the location of the manholes over which the cable manufacturer and the user seldom if ever have complete or even partial control. As a result of this, the reel lengths may and usually do vary greatly in length. In this connection it is to be borne in mind that the longer the reel length the greater will be the volume of oil which has to be taken care of by the reservoirs associated therewith.

The object of my invention is to provide an improved construction and arrangement for use in underground high tension cables whereby I overcome the above-enumerated objections to the long lengths of cable between stop joints, obtaining the advantages of relatively short cable lengths, but at the same time avoiding the high cost of providing additional stop joints.

According to my invention, I divide the cable as heretofore into long sections by means of stop joints through which oil cannot pass, the length of each long cable section being so related to the angle at which it extends that the pressure at the lowest point due to the static head of the oil in the section is within a safe predetermined value. I then divide each long section into a plurality of sub-sections by inserting therein at suitable points what I term "semi-stops". These semi-stops, while they serve to stop up the channels in the cable or ordinary splices, are not absolutely tight against leakage as are the stop joints at the ends of the main sections (which stop-joints may be termed true stop-joints), because they permit oil to seep slowly through the laminated insulation of the cable or joint. However, such semi-stops may be made comparatively simple in structure and may be provided at low cost. The seepage of oil through the semi-stops is so slow that in case one sub-section bursts open, allowing the oil in that section to escape, adjacent sub-sections will not be drained of oil for many hours, giving repairmen plenty of time to locate the trouble and stop the leakage before additional damage is done.

While giving safety in this respect, however, the semi-stops introduce a certain and peculiar danger that must be overcome. Gradual seepage of oil from one subsection to an adjacent one, due to differences in elevation or differences in reservoir pressures, would sooner or later overcharge the reservoir or reservoirs connected to the adjacent sub-sections. Increased temperature produced for instance, by a sudden loading, would expand the oil in the cable and cause a dangerous bursting pressure in this subsection which could not be relieved by the already overcharged reservoirs. To overcome this danger, I provide in connection with the cable sub-sections, expansion reservoirs for the oil which are so adjusted and related to each other and to static heads in the cable sub-sections that substantially the same pressure is maintained on opposite sides of the semi-stops. By this arrangement, the tendency for leakage of appreciable quantities of oil past the semi-stops is avoided and the danger of excessive internal pressures caused thereby is prevented. At the most, only harmlessly small cyclic transfer of oil will occur as the cable heats and cools.

The several expansion reservoirs are arranged, as by locating them in manholes, so that they all are subjected to substantially the same atmospheric conditions whereby variations due to unequal temperature changes at different chambers are avoided. By this means, the result is obtained that when the temperature of the cable increases or decreases, causing expansion or contraction of oil in the cable sections, the pressures in the reservoirs appurtenant to the respective sub-sections will increase and decrease together and by substantially the same amounts. As a result, therefore, the pressure on opposite sides of each semi-stop will be maintained substantially the same under all operating conditions.

In the drawing, Fig. 1 is a diagrammatic view of a portion of a cable installation embodying my invention; Fig. 2 is a detail, sectional view on a larger scale through one form of semi-stop and an adjacent reservoir, and Figs. 3 and 4 are views of modifications.

In the drawing, 1 and 2 indicate true stop joints which define a length of cable. These true stop joints may be of any suitable design and are of a character such as to prevent leakage of oil past them. The cable length is shown as being located at a point where the earth's surface is of an irregular, sloping nature, the cable extending along at different angles to the horizontal. The cable section is divided into a number of sub-sections, 3, 4, 5, 6, 7 and 8 which may be of similar or different lengths by means of semi-stops 9, 10, 11, 12 and 13. The semi-stops may be of any suitable or desired construction, and they may or may not be embodied along with a cable splice or joint as found desirable. For example, I may use a semi-stop construction such as that shown in the patent of Eugene D. Eby, No. 1,819,881 issued August 18, 1931, wherein the semi-stop forms a part of a cable splice or joint. In Fig. 2, I have illustrated a form of semi-stop which may be utilized. It comprises a casing structure 14 suitably connected to the lead sheath 15 at the adjacent ends of the two cable lengths. For example, the adjacent ends of the cable lengths 4 and 5. The adjacent conductor ends of the cable lengths are jointed together by a suitable connector 16 and are covered with a wrapping of insulating material 17 of any suitable type. Between the interior of the cable structure and the casing 14 are arranged the semi-stop disks or dams 18 which serve to prevent flow of oil between adjacent sub-sections, the only possibly exchange of oil being in the form of a slow seepage around and under the dams through the cable insulation which is not completely impervious to oil. In the arrangement shown in Fig. 2 the continuous oil channels in the cable are directly under the lead sheath and are indicated at 19.

Associated with each cable sub-section, and preferably with its highest point since this is the most desirable point of connection, is a pressure reservoir of suitable construction. In Fig. 1 reservoirs for the respective sections are indicated at 20, 21, 22, 23, 24 and 25. They are at substantially the same relative heights above the respective joints they are connected to as for example by being located in the same manhole.

One form of reservoir is shown in section in Fig. 2. It comprises an outer casing 26 sealed at its two ends by means of heads 27 and 28. Inside the casing is a diaphragm structure comprising a plurality of cells 29 connected in multiple by a pipe structure 30 to the cable sub-section. The walls of the cells are made preferably of very thin metal and also corrugated to give a near approach to perfect flexibility and the walls may be provided with wedge-shaped spacing collars 31 which serve to give mechanical support for the cell walls. The diaphragm structure fills only partially the casing 26. As shown, the walls of the cells are separated by an amount determined by the difference of pressure between the oil within the cells and the gas pressure within the casing. As the oil pressure increases the walls continue to move outwardly until they are in contact over practically their entire area thereby affording mechanical support, one cell for the other. On the other hand, as the oil pressure decreases, the external pressure remaining substantially constant, the walls of each cell move gradually inward toward the collapsed position of the cell. This inward movement first causes a small portion or surface area of the walls to rest on the wedge-shaped spacer, said area increasing as the walls continue to approach each other. Later, when fully collapsed, the walls of the cells contact with each other, thus affording mechanical support, one for the other. From the foregoing it will be seen that although the walls are made of very thin metal to give great flexibility which implies that of themselves they are incapable of withstanding substantial differences of pressure without bursting, nevertheless the arrangement is such that the walls of the cells are fully supported mechanically, both in the expanded and collapsed condition of said cells, and that there are no sharp corners or surfaces where the metal of the walls is highly stressed. The remaining portion of the casing is filled with a suitable elastic fluid, such for example as, some suitable gas which is put in the casing under pressure, so as to establish in the casing and on the diaphragm structure a certain initial pressure. At 32 is indicated a suitable filling valve through which the fluid may be forced into casing 26. With this arrangement, it will be seen that as the diaphragm expands and contracts due to oil from the cable being forced into it or to oil flowing from it to the cable, the pressure in casing 26 acting on the diaphragm structure will be increased and decreased due to decrease and increase in the space occupied by the gas.

In carrying out my invention, I provide in each of the expansion reservoirs, 20 to 25 inclusive, gas pressures such that the resultant pressure on opposite sides of each semi-stop will be the same or substantially the same. This result may be accomplished by providing in the expansion reservoir at the highest level a certain pressure, preferably a pressure which at no load on the cable and at the lowest temperature to be met with is equal to or slightly greater than atmospheric pressure and in the expansion reservoirs located at lower levels a pressure equal to that in the expansion reservoir at the highest level plus an amount equal to the static pressure in the cable section due to the static head of the oil therein. Taking specifically the arrangement shown in Fig. 1, expansion reservoirs 22 and 23 are at the highest levels and in them is established a suitable gas pressure of the lowest value which may be utilized and still meet the required operating conditions. In reservoir 21 is established a gas pressure equal to that in reservoir 22 plus an additional amount equal to a column of oil of the same height as the difference in elevation of reservoirs 21 and 22. In reservoir 20 is established a gas pressure equal to that in reservoir 21 plus an amount equal to a column of oil of the same height as the difference in elevation of reservoirs 20 and 21. And in a similar manner, the gas pressures in the other reservoirs are established.

With the gas pressures in the reservoirs adjusted relatively to each other, as described above, it will be clear that substantially the same pressure obtains on opposite sides of each semi-stop which means that there will be no tendency for oil to leak past the semi-stops. As the oil in the cable sub-sections expands and contracts due to temperature changes, the pressures in the respective reservoirs will increase and decrease together and by like amounts thus maintaining always substantially equal pressure on opposite sides of each semi-stop. In this connection, it will be understood that the respective reservoirs are so designed as to size, gas and oil content, diaphragm characteristics and with regard to the length of cable section which they serve that the desired result, as above set forth, is obtained. Such design may be accomplished by utilizing mathematical calculations or it may be accomplished by data obtained experimentally. Prior to laying out the cable system the territory over which the cable is layed is carefully surveyed to determine the profile and also the distances between manholes, which latter determine the reel lengths. From the data thus obtained the gas volumes in the various reservoir casings is roughly adjusted during manufacture by giving to said casing greater or less heights or lengths. Further and more accurate adjustment of gas volume is made in the field in one of two ways. If the gas volume of the reservoir for any particular location is too large, it may be reduced by merely pouring into the casing, and outside of the cells, a measured quantity of oil. On the other hand if the casing contains oil a measured quantity may be removed to increase the gas volume, or an auxiliary gas tank may be provided and connected to the reservoir as mentioned later on. If a length of cable which is serviced by a reservoir is twice as long as another it will contain twice as much oil, which means a larger reservoir, and the volume of gas acting on the cells within the larger reservoir will have to be twice as great to give the proper balance if the cable is on level ground. On the other hand if the lengths of cable involved are at different elevations, the relative gas volumes and pressure settings are thereby further affected as may be determined by calculation. The fact that the gas volume or the pressure of the gas or both within the reservoirs may be readily adjusted makes their design practically universal, which materially simplifies the system as a whole. As a practical matter it is preferable to make each casing a little larger than is necessary and make the final adjustment in the field by merely pouring in more or less oil. Since the oil of the cable is confined to the inside of the cells where it is out of contact with air and moisture, it follows that the simple procedure above outlined cannot in any way contaminate it, a feature of great practical importance. I have described my invention in connection with reservoirs wherein the oil is supplied to the interior of the diaphragms and the gas to the exterior of the diaphragms and this is the arrangement I now prefer, but it will be understood that this arrangement may be reversed and also, that I may utilize any equivalent means for establishing pressures on the diaphragms, although I now prefer to utilize gas. Likewise, the gas may be contained entirely in the casing 26 or an auxiliary gas tank of desired capacity and pressure may be provided, connected by suitable piping to casing 26.

Referring to Fig. 3 wherein I have shown another application of my invention, 35, 36 and 37 indicate cable sections or cable sub-sections comprising oil-filled cable having continuous channels. The cable sections or sub-sections are separated by joints 38 and 39 which may be of either the true stop joint type or the semi-stop type. Cable section 36 represents a cable run on a slope. It may be of any desired length. If longer than the usual reel lengths, it may have ordinary splices intermediate to the several joints 38 and 39 although these are not shown in Fig. 3. In connection with a cable length of this type, (which for example may be considered as being one of the cable lengths shown in Fig. 1,) it may be that, due to some cause such as, for example, excessive length of cable, small size of channel or high viscosity of oil, it would be inadvisable to feed the entire section from a single reservoir 41 at only the high point because of the excessive oil pressure drop along the section. Under these circumstances, the difficulty is overcome by providing another reservoir 40 at the low point, the two reservoirs 40 and 41 being so designed, adjusted and balanced by the methods already described as to work together in harmony, each doing its share of the work and feeding its half of the cable section. The total pressure drop along the sections is thereby greatly reduced. If found desirable, an additional and intermediate reservoir or reservoirs may be inserted, at any point desired, between reservoirs 40 and 41, and one such reservoir is indicated at 42. In this case, the reservoirs in the section are designed adjusted and balanced in accordance with the methods already described. Pressure drop along the cable can in this way be reduced to any desired value.

My invention may be utilized also in connection with other designs of underground cable. For instance, it may be used in connection with the ordinary, so-called "solid type" cable, that is, a lead sheathed cable having copper conductors insulated with paper wrappings impregnated with a heavy compound or oil and without the continuous oil channels previously described. Such a cable offers a very high resistance to the longitudinal oil flow, the oil seeping through very slowly. In applying my invention to this type of cable, the disks or dams 18 as illustrated in Fig. 2 are not needed, the cable itself acting as a semi-stop joint. Nevertheless, with such a cable structure, oil will seep slowly from the high reservoir or reservoirs to the lower reservoir or reservoirs, overcharging the latter and subjecting the cable line to the dangers already pointed out. A balanced system of reservoir feeding as herein described, will prevent this objectionable transfer of oil from one reservoir to another and cause all reservoirs to work together in harmony, each doing its fair share of the work.

In Fig. 4, 45 indicates a length of solid cable and 46, 47 and 48 indicate oil reservoirs suitably connected thereto, the same being designed, adjusted and balanced to obtain the desired result. By using sealed reservoirs having the characteristics set forth in connection with Fig. 2 and filling the portion of the chamber therein not occupied by the cells with gas or gas and oil in suitable amounts which is or are carefully excluded from the cable for the purpose of obtaining initial and individual pressure settings suited to the profile of the land on which the cable is laid, the great advantage is obtained that the feeding reservoirs instead of being located at a substantial elevation on expensive towers situated above the ground level in order to obtain the necessary hydrostatic pressure on the cable may be located at approximately the same level as the cable. As a practical matter this means that the reservoirs will be located in the same manholes as the cable joints where the hydrostatic head, due to difference of elevation of reservoirs and cable, is negligible and gas pressure utilized in the manner described to obtain the desired pressure within the cable, and where the changes in atmospheric conditions will affect the reservoirs and cable equally. The specific construction of the reservoir is not claimed herein as it forms the subject matter of my divisional application for patent, Serial No. 648,452, filed December 22, 1932.

In accordance with the provisions of the patent statutes, I have described the principles of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is,—

1. The combination with a length of cable which extends at an angle to the horizontal and offers a certain resistance to the flow of oil through it, of variable pressure expansion reservoirs connected to said cable length at spaced points and different elevations, the level of each reservoir at the point of connection being approximately that of the cable, said reservoir at the lower level having established in it an initial pressure sufficient to balance the static head of oil in the length of cable between it and the upper reservoir, and said reservoir at an intermediate level having established in it initial pressure less than that of the one at the lower level and greater than that of the one at the upper level.

2. In combination, an oil-filled cable, semi-stops dividing the cable into sections, and means for maintaining substantially equal oil pressures on opposite sides of said semi-stops.

3. In combination, an oil-filled cable, semi-stops dividing the cable into sections, and expansion reservoirs for the oil associated with the cable sections and so correlated relatively to each other as to maintain substantially equal oil pressures on opposite sides of said semi-stops.

4. In combination, an oil-filled cable, semi-stops dividing the cable into sections, expansion reservoirs for the oil associated with the cable sections and so correlated relatively to each other as to maintain substantially equal oil pressures on opposite sides of the stops, said reservoirs comprising a sealed casing, a diaphragm structure therein, and means connecting one side of the diaphragm structure to the oil space of the cable, the other side of the diaphragm being subject to a certain predetermined pressure.

5. In combination, an oil-filled cable, semi-stops dividing the cable into sections, expansion reservoirs for the oil associated with the cable sections and so correlated relatively to each other as to maintain substantially equal oil pressures on opposite sides of the stops, said reservoir comprising a sealed casing, a diaphragm structure therein, and means connecting one side of the diaphragm structure to the oil space of the cable, the other side of the diaphragm being subject to a certain predetermined fluid pressure.

6. The combination with a length of oil-filled cable having stop joints at its ends, of semi-stops dividing the cable length into sections, and means associated with said semi-stops for balancing the oil pressures on opposite sides of the semi-stops.

7. The combination with a length of oil-filled cable of means which serves substantially to prevent flow of oil along the cable, and means associated with said first-named means for balancing the oil pressure on opposite sides of said first-named means.

8. The combination with a length of cable containing liquid insulation, fluid stop joints which divide the cable into sections and prevent the transfer of liquid from one section to another while permitting electric current to flow, semi-stop joints in the sections which divide them into sub-sections and prevent the free flow of liquid insulation from one to another, reservoirs for the liquid insulation connected to the cable sub-sections at spaced intervals, some of said reservoirs having different characteristics, and means whereby the pressures in the reservoirs may be individually adjusted to different values to compensate for the difference in said characteristics to cause synchronous operation.

9. The combination with a length of cable containing liquid insulation, fluid stop joints which divide the cable into relatively long lengths and prevent the transfer of liquid from one section to another while permitting electric current to flow, semi-stop joints which divide some of the sections into a plurality of sub-sections and prevent the free flow of liquid from one sub-section to another, reservoirs connected to the sub-sections which normally have different operating characteristics, and means for adjusting the reservoirs individually so that their characteristics are rendered substantially similar as liquid flows into and out of them to cause synchronous operation.

10. The combination with a length of cable containing liquid insulation, a semi-stop joint which divides the length into sub-sections, an expansion reservoir connected to a sub-section on one side of a semi-stop joint and containing liquid at a pressure above that of the atmosphere, and a second expansion reservoir at a lower elevation also connected to a sub-section and on the opposite side of said semi-stop joint, and containing liquid at a pressure equal to that of the first-named reservoir plus an amount equivalent to the static head of the liquid in the cable between the two reservoirs whereby said reservoirs operate in synchronism under change of temperature of the cable.

11. The combination with a length of cable containing liquid insulation, semi-stop joints which divide the length into sub-sections, expansion reservoirs for liquid connected to the sub-sections at spaced intervals and different elevations, with a semi-stop joint between each two reservoirs, each of said reservoirs being adjusted to the same pressure as the next adjacent one of higher elevation plus an amount equivalent to the static head represented by the column of fluid in the cable between the two reservoirs.

12. In a cable installation, the combination with a length of cable, of reservoirs for liquid located at spaced intervals along the cable at approximately the same elevation as the cable so that differences in hydrostatic head are negligible, said reservoirs each having a chambered casing sealed against the atmosphere, a cellular means therein having an elastic wall, said means defining a liquid receiving chamber between which and the cable liquid is free to flow, and means for introducing an elastic medium under superatmospheric pressure into the respective chambers of the reservoirs where it acts on the walls of the cellular means in opposition to the liquid contained therein, and by an amount in each case determined by the elevation of the particular reservoir with respect to those of others connected to the cable.

13. An electric cable system comprising an insulated conductor, an impervious enclosure therefor, liquid insulation filling the enclosure to the substantial exclusion of voids, reservoirs servicing determined lengths of the cable and constantly exerting pressure on the liquid to prevent void formation, each reservoir comprising a sealed expansible element connected to the interior of the enclosure to receive liquid from and return it thereto as the volume of liquid changes due to temperature changes, said reservoirs being individually adjusted as to pressure, depending upon the length of cable serviced thereby and its elevation with respect to adjacent connected lengths one with respect to the others, and operating in unison so that upon an increase of volume of the liquid each receives substantially its proportionate share thereof from the length of cable serviced by it, and upon a decrease in volume returns the share so received to the cable thereby preventing substantial transfer of liquid between reservoirs.

14. An electric cable system comprising connected lengths of insulated conductor, an impervious enclosure therefor, liquid insulation filling the enclosure under pressure to the substantial exclusion of voids, reservoirs each servicing a determined length of the cable and comprising a sealed reservoir connected to the interior of the enclosure to receive liquid from and returning it thereto as the volume of liquid changes due to temperature changes, and a body of gas under pressure in each reservoir acting in opposition to liquid entering the reservoir, the bodies of gas in the respective reservoirs being individually adjusted as to volume and pressure, as determined by the length of the cable serviced thereby and also by the respective elevations of the parts of the cable system where the connections thereto are made, to cause said reservoirs to operate in unison, each receiving its approximate share of the total liquid displaced from the cable as the volume of the liquid increases and returning to the cable its share of the liquid so received as the volume decreases.

15. An electric cable system comprising an insulated conductor, an impervious enclosure therefor, liquid insulation filling the enclosure under positive pressure at all times to the substantial exclusion of voids, sealed reservoirs operating under different and variable pressures depending upon the elevation of the length of cable serviced with respect to adjacent connected lengths, each having a capacity for liquid depending upon the length of cable serviced thereby, and a body of gas in each reservoir individually adjusted as to volume and pressure without exposing the gas to the atmosphere so as to cause all of the reservoirs to operate in unison, each receiving from the cable and retaining its approximate share of the total liquid displaced as the volume thereof increases and returning to the cable the share of liquid so received as the volume decreases.

16. An electric cable comprising an insulated conductor, an enclosure therefor filled with liquid insulation, a portion at least of said cable being inclined to the horizontal, liquid containing reservoirs located at intervals along said inclined cable and communicating with the liquid in the enclosure, and means in connection with each reservoir for maintaining a determined pressure upon the liquid therein, the pressure of the pressure maintaining means of the different reservoirs being graded according to the elevation of the cable at the points where the reservoirs are located so that each reservoir will receive and retain its share of the total liquid displaced as the volume increases and return its said share as the volume decreases.

17. An electric cable system comprising connected lengths of insulated conductors having impervious enclosures, liquid under positive pressure filling the enclosures to the substantial exclusion of voids, reservoirs located at spaced intervals along the length of the cable and operating under varying pressures, each reservoir comprising two principal elements, one within the other, one element having rigid walls defining a sealed chamber and the other a movable wall defining a receptacle of variable capacity, a conduit connecting one of the elements to the enclosure of a cable length through which liquid is free to flow, a body of gas in the other of said elements of determined volume and pressure acting on the movable wall, the volumes and pressures of the gas in the several reservoirs having different values determined by the length of cable serviced thereby and by the respective elevations thereof to cause all of the reservoirs to operate in unison, each receiving and retaining its approximate share of the total liquid displaced from the cable lengths as the volume thereof increases and returning to the cable the amount of liquid so received as the volume decreases, thereby preventing substantial transfer of liquid between reservoirs.

18. The method of installing and operating an electric cable system comprising an insulated conductor and an impervious enclosure therefor filled with liquid insulation under pressure, which comprises connecting sealed variable pressure expansible reservoirs to the interior of the cable enclosure at spaced intervals along its length to receive liquid from and return it to the enclosure as the volume of liquid varies with the temperature changes, and individually adjusting the reservoirs as to volume and pressure as determined by the lengths of the cable serviced by them and the relative elevations of the parts of the cable system where the connections thereto are made, to cause the reservoirs to operate in unison under conditions of variable liquid pressure, each receiving from and retaining its approximate share of the total liquid of the cable, as the volume thereof increases and each returning to the cable its share of liquid so received as the volume decreases and preventing substantial transfer of liquid between reservoirs.

GEORGE B. SHANKLIN.